US010591028B2

(12) United States Patent
Villarreal

(10) Patent No.: US 10,591,028 B2
(45) Date of Patent: Mar. 17, 2020

(54) TRANSMISSION ASSEMBLY AND METHOD

(71) Applicant: Joe G. Villarreal, Corpus Christi, TX (US)

(72) Inventor: Joe G. Villarreal, Corpus Christi, TX (US)

(73) Assignee: Joe G. Villarreal, Corpus Christie, TX (US)

( * ) Notice: Subject to any disclaimer, the term of this patent is extended or adjusted under 35 U.S.C. 154(b) by 332 days.

(21) Appl. No.: 15/621,814

(22) Filed: Jun. 13, 2017

(65) Prior Publication Data

US 2017/0356531 A1 Dec. 14, 2017

Related U.S. Application Data

(60) Provisional application No. 62/349,295, filed on Jun. 13, 2016.

(51) Int. Cl.
*F16H 47/04* (2006.01)
*F16H 15/42* (2006.01)
(Continued)

(52) U.S. Cl.
CPC .......... *F16H 15/42* (2013.01); *F02B 67/06* (2013.01); *F16H 3/40* (2013.01); *F16H 15/503* (2013.01); *F16H 47/04* (2013.01); *F16H 59/40* (2013.01); *F16H 61/6649* (2013.01); *F16H 61/66272* (2013.01); *F16H 63/065* (2013.01); *F16H 2037/0866* (2013.01); *F16H 2059/704* (2013.01); *F16H 2061/66281* (2013.01)

(58) Field of Classification Search
CPC ................................ F16H 47/04; F16H 48/08
See application file for complete search history.

(56) References Cited

U.S. PATENT DOCUMENTS 3,090,253 A * 5/1963 Linsley ................... F16H 47/04
475/72
3,905,251 A * 9/1975 Greene ................... F16H 47/04
475/72

(Continued)

FOREIGN PATENT DOCUMENTS

WO   WO-9206316 A1 * 4/1992 ............... F16H 3/72
WO   2008038043 A2    4/2008

OTHER PUBLICATIONS

International Search Report and Written Opinion dated Aug. 28, 2017, for International Application No. PCT/US2017/037310.

*Primary Examiner* — Sherry L Estremsky
(74) *Attorney, Agent, or Firm* — Conley Rose, P.C.

(57) ABSTRACT

A transmission assembly includes a ring gear configured to receive an input torque from a power source, a carrier assembly coupled to the ring gear, the carrier assembly configured to rotate about a first axis and including a housing, and a spider gear rotatably coupled to the housing, a carrier outlet shaft including a carrier outlet gear in meshed engagement with the spider gear, wherein the carrier outlet shaft is configured to transmit an output torque to a driveshaft, a control shaft including a control gear in meshed engagement with the spider gear, and a load applicator coupled to the control shaft, wherein the load applicator is configured to provide a resistive torque to the control shaft to resist rotation of the control shaft and vary a gear ratio between the driveshaft and the input shaft.

20 Claims, 7 Drawing Sheets

(51) Int. Cl.
*F16H 15/50* (2006.01)
*F16H 59/40* (2006.01)
*F16H 61/662* (2006.01)
*F16H 61/664* (2006.01)
*F16H 63/06* (2006.01)
*F02B 67/06* (2006.01)
*F16H 3/40* (2006.01)
*F16H 59/70* (2006.01)
*F16H 37/08* (2006.01)

(56) References Cited

U.S. PATENT DOCUMENTS

| | | | | |
|---|---|---|---|---|
| 5,234,388 | A * | 8/1993 | Nordkvist | F16H 48/08 475/230 |
| 5,785,623 | A * | 7/1998 | Iino | F16H 47/04 475/72 |
| 5,888,162 | A * | 3/1999 | Moeller | F16H 3/62 475/72 |
| 6,442,934 | B1 * | 9/2002 | Okuda | F04B 49/002 60/451 |
| 7,588,509 | B1 | 9/2009 | Marsha | |
| 7,712,573 | B2 * | 5/2010 | Sakamoto | F16H 47/04 180/242 |
| 7,824,290 | B1 * | 11/2010 | Brookins | B60K 6/12 475/107 |
| 8,771,127 | B2 * | 7/2014 | Six | F16H 48/36 475/198 |
| 9,695,920 | B2 * | 7/2017 | Heindl | B60K 17/346 |
| 2007/0117670 | A1 * | 5/2007 | Buender | F16H 47/04 475/78 |
| 2014/0256491 | A1 | 9/2014 | Henderson, Jr. et al. | |
| 2014/0274535 | A1 | 9/2014 | Hamrin et al. | |

* cited by examiner

TRANSMISSION ASSEMBLY AND METHOD

CROSS-REFERENCE TO RELATED APPLICATIONS

This application claims benefit of U.S. provisional patent application Ser. No. 62/349,295 filed Jun. 13, 2016, and entitled "Transmission Assembly and Method," which is hereby incorporated herein by reference in its entirety.

STATEMENT REGARDING FEDERALLY SPONSORED RESEARCH OR DEVELOPMENT

Not applicable.

BACKGROUND

Transmissions receive an input rotational torque and rotational speed from an input device coupled to a power source (e.g., an input shaft), convert the rotational torque and speed received from the input device, and transmit the converted rotational torque and rotational speed to an output device (e.g., output shaft). For instance, in some applications transmissions convert or adjust the rotational speed received from the input device such that the rotational speed of the output device varies from the rotational speed of the input device, and where the ratio of the rotational speeds of the input and output devices defines a speed or gear ratio of the transmission. Transmissions are used in a variety of applications, including motor vehicles, construction machinery, power generation systems, and other industrial machinery.

In some applications, transmissions comprise a plurality of discrete and selectable gear ratios between the input and output devices. In these applications, the desired gear ratio of the transmission may be selected manually in manual transmissions and automatically in automatic transmissions. In other applications, transmissions are configured to change seamlessly through a continuous range of gear ratios, such as continuously variable transmissions (CVTs). In certain applications, CVTs are configured to allow the input shaft to remain at a constant rotational speed while continuously varying the rotational speed of the output device, allowing the power source coupled to the input device to operate at a preferred rotational speed, such as the rotational speed that provides optimum power or fuel efficiency.

In some applications, CVTs may comprise a belt or chain frictionally engaging a pair of rotatable pulleys, where each pulley includes a continuously adjustable outer diameter to vary the gear ratio between the rotatable pulleys. Given that these CVTs rely on frictional engagement between the belt and the pulley, instead of engagement between interlocking gear teeth in traditional automatic and manual transmissions, some CVTs may be limited in the amount of torque they may transmit between the input and output devices. Further, other CVT designs may include a relatively large number of moving parts, limiting their durability and increasing the effort and cost to design, manufacture, maintain, and repair.

SUMMARY

An embodiment of a transmission assembly comprises a ring gear configured to receive an input torque from a power source, a carrier assembly coupled to the ring gear, the carrier assembly configured to rotate about a first axis and comprising a housing, and a spider gear rotatably coupled to the housing, a carrier outlet shaft comprising a carrier outlet gear in meshed engagement with the spider gear, wherein the carrier outlet shaft is configured to transmit an output torque to a driveshaft, a control shaft comprising a control gear in meshed engagement with the spider gear, and a load applicator coupled to the control shaft, wherein the load applicator is configured to provide a resistive torque to the control shaft to resist rotation of the control shaft and vary a gear ratio between the driveshaft and the input shaft. In some embodiments, the spider gear is configured to rotate about a second axis orthogonal to the first axis. In some embodiments, the load applicator comprises a hydraulic pump. In certain embodiments, the load applicator is configured to provide the resistive torque to the control shaft in response to the application of the input torque to the ring gear. In certain embodiments, in response to the application of the resistive torque to the control shaft, the control shaft rotates at a rotational speed that is different from the rotational speed of the carrier outlet shaft. In some embodiments, the transmission assembly further comprises a load controller coupled to the load applicator and configured to control the amount of resistive torque applied to the control shaft from the load applicator. In some embodiments, the transmission assembly further comprises a hydraulic circuit coupled to the load controller and the load applicator, wherein the load applicator comprises a pump, wherein the load controller comprises a valve configured to controllably restrict fluid flow through the hydraulic circuit. In certain embodiments, the transmission assembly further comprises controller in signal communication with the load controller and configured to actuate the load controller between open and closed positions. In certain embodiments, the transmission assembly further comprises a torque applicator configured to controllably apply torque to the carrier outlet shaft. In some embodiments, the transmission assembly further comprises a hydraulic circuit coupled to the load controller and the load applicator, wherein the load applicator comprises a pump fluidically coupled to the hydraulic circuit, wherein the torque applicator comprises a motor fluidically coupled to the hydraulic circuit and is configured to convert pressure of hydraulic fluid in the hydraulic circuit into rotational torque. In some embodiments, the transmission assembly further comprises a bypass circuit fluidically coupled to the hydraulic circuit, and a bypass valve fluidically coupled to the bypass circuit and configured to permit a fluid flow in the hydraulic circuit to bypass the torque applicator when the bypass valve is in an open position. In certain embodiments, the transmission assembly further comprises a roller bearing coupled between the spider gear and the housing of the carrier assembly.

An embodiment of a transmission assembly comprises a ring gear configured to receive an input torque from a power source, a carrier assembly coupled to the ring gear, a carrier outlet shaft coupled to the carrier assembly and configured to transmit an output torque to a driveshaft, a control shaft comprising a control gear coupled to the carrier assembly, a load applicator coupled to the control shaft, wherein the load applicator is configured to provide a resistive torque to the control shaft to resist rotation of the control shaft, a load controller coupled to the load applicator and configured to control the amount of resistive torque applied to the control shaft from the load applicator, and a hydraulic circuit coupled to the load controller and the load applicator, wherein the load applicator comprises a pump fluidically coupled to the hydraulic circuit and the load controller comprises a valve configured to controllably restrict fluid flow through the hydraulic circuit. In some embodiments, the carrier assembly comprises a housing, and a spider gear rotatably coupled to the housing, wherein the carrier outlet shaft comprises a carrier outlet gear in meshed engagement with the spider gear and the control shaft comprises a control gear in meshed engagement with the spider gear. In some embodiments, the transmission assembly further comprises a roller bearing coupled between the spider gear and the housing of the carrier assembly.

An embodiment of a motor vehicle system comprises a prime mover, a transmission rotatably coupled to the prime mover with an input shaft, and a driveshaft rotatably coupled to the transmission, wherein the transmission provides a geared coupling between the input shaft and the driveshaft, wherein the transmission provides a continuously variable gear ratio between the input shaft and the driveshaft. In some embodiments, the transmission comprises a ring gear configured to receive an input torque from the prime mover, a carrier assembly coupled to the ring gear, the carrier assembly configured to rotate about a first axis and comprising a housing, a spider gear rotatably coupled to the housing, a carrier outlet shaft comprising a carrier outlet gear in meshed engagement with the spider gear, a control shaft comprising a control gear in meshed engagement with the spider gear, and a load applicator coupled to the control shaft, wherein the load applicator is configured to provide a resistive torque to the control shaft to resist rotation of the control shaft and vary the gear ratio between the driveshaft and the input shaft. In some embodiments, the transmission further comprises a reverse gear coupled to the carrier outlet shaft of the carrier assembly. In certain embodiments, the motor vehicle system further comprises a hydraulic circuit fluidically coupled to the load applicator, a load controller fluidically coupled to the hydraulic circuit and configured to control the amount of resistive torque applied to the control shaft from the load applicator, wherein the load controller comprises a valve configured to controllably restrict fluid flow through the hydraulic circuit, and a controller in signal communication with the load controller and configured to actuate the load controller between open and closed positions. In certain embodiments, the motor vehicle system further comprises a torque applicator configured to controllably apply torque to the carrier outlet shaft, wherein the torque applicator comprises a motor fluidically coupled to the hydraulic circuit and is configured to convert pressure of hydraulic fluid in the hydraulic circuit into rotational torque.

BRIEF DESCRIPTION OF THE DRAWINGS

For a detailed description of exemplary embodiments, reference will now be made to the accompanying drawings in which.

DETAILED DESCRIPTION

Figure 1:
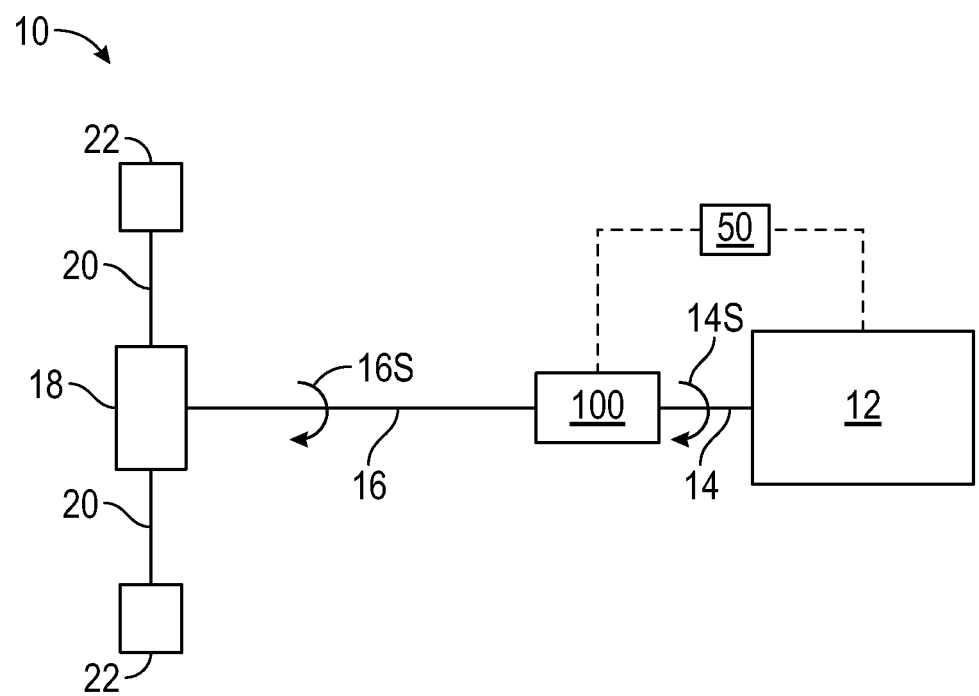
FIG. 1 is a schematic view of a motor vehicle system including an embodiment of a transmission assembly in accordance with principles disclosed herein.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . " Any use of any form of the terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Referring now to FIG. 1, an embodiment of an automobile or motor vehicle system 10 is shown. While FIG. 1 illustrates only the power or drive train of motor vehicle system 10, it is understood that system 10 includes other components (not shown) such as an exterior body, chassis, suspension, etc. In this embodiment, motor vehicle system 10 generally includes a power source or prime mover 12, an input device 14, a transmission 100, an output device 16, a differential 18, a pair of axles 20, and a pair of wheels 22. In this embodiment, prime mover 12 is an internal combustion engine configured to translate chemical energy provided by a fuel source (not shown) into mechanical energy comprising rotational torque at a given rotational speed. In other embodiments, the prime mover (e.g., prime mover 12) comprises another type of power source such as an electric motor. In still other embodiments, transmission 100 may be used in drive trains that do not comprise differential 18 and/or wheels 22. In this embodiment, input device 14 comprises an input shaft 14 coupled with the prime mover 12 and transmission 100. In this arrangement, mechanical energy is provided to input shaft 14 from prime mover 12, resulting in the rotation of input shaft 14 at a first or input rotational speed 14S.

Output device 16 of vehicle system 10 comprises an output or driveshaft 16 coupled with transmission 100. In this embodiment, transmission 100 is generally configured to translate the input rotational speed 14S received from input shaft 14 into a second or output rotational speed 16S of driveshaft 16, where output rotational speed 16S may vary from input rotational speed 14S. Particularly, the output rotational speed 16S may vary continuously with respect to input rotational speed 14S such that transmission 100 comprises a continuously variable transmission. In other words, transmission 100 is configured to provide a continuously variable gear ratio (i.e., input rotational speed 14S divided by output rotational speed 16S) between input shaft 14 and output shaft 16. In this manner, the output rotational speed 16S may be continuously adjusted or altered while the input rotational speed 14S remains substantially constant. Additionally, in this embodiment, transmission assembly comprises a geared continuously variable transmission that provides a continuously variable gear ratio without relying on belts or similar mechanisms (chains, etc.) for transferring power between input shaft 14 and driveshaft 16.

In this embodiment, driveshaft 16 is coupled with differential 18, where differential 18 is configured to receive rotational torque from output shaft 16 at output rotational speed 16S and divide the rotational torque from output shaft 16 between the pair of axles 20, which frictionally engage a surface via wheels 22 coupled thereto. In certain embodiments, differential 18 is configured to divide the rotational torque between axles 20 while allowing each axle 20 to rotate at a different rotational speed. Moreover, in certain embodiments differential 18 is configured to distribute the torque received from driveshaft 16 unequally between axles 20 depending on the degree of traction between each wheel 22 and the surface. Although transmission 100 is described herein as part of motor vehicle system 10, in general, transmission 100 can be used in a variety of other applications including, without limitation, industrial equipment (e.g., drilling rigs, cranes, tractors, mills, etc.), power generation systems (e.g., wind generators, hydroelectric generators, etc.), marine systems, and other mechanical systems.

In this embodiment, motor vehicle system 10 additionally includes a control system or powertrain controller 50 in signal communication with both the prime mover 12 and transmission 100. Powertrain controller 50 is configured to assist in controlling or managing the operation of prime mover 12 and transmission 100. Powertrain controller 50 comprises one or more sensors measuring various parameters of motor vehicle system 10 that comprise control system inputs to powertrain controller 50 as controller 50 manages the operation of power system 12 and transmission 100. In this embodiment, powertrain controller 50 measures the speed or revolutions per minute (RPM) of prime mover 12, speed of motor vehicle system 10, the position of a throttle controlling air and/or fuel flow to prime mover 12, the load or resistance to rotation of wheels 22 in response to the application of torque from prime mover 12, a turn ratio (ratio of input RPM to output RPM) of system 10 as well as the percentage of current turn ratio to maximum turn ratio, and the fuel economy (measured in miles/gallon) of system 10. In other embodiments, powertrain controller 50 may measure one or more of the above described control parameters, as well as additional parameters not listed above.

Figure 2:
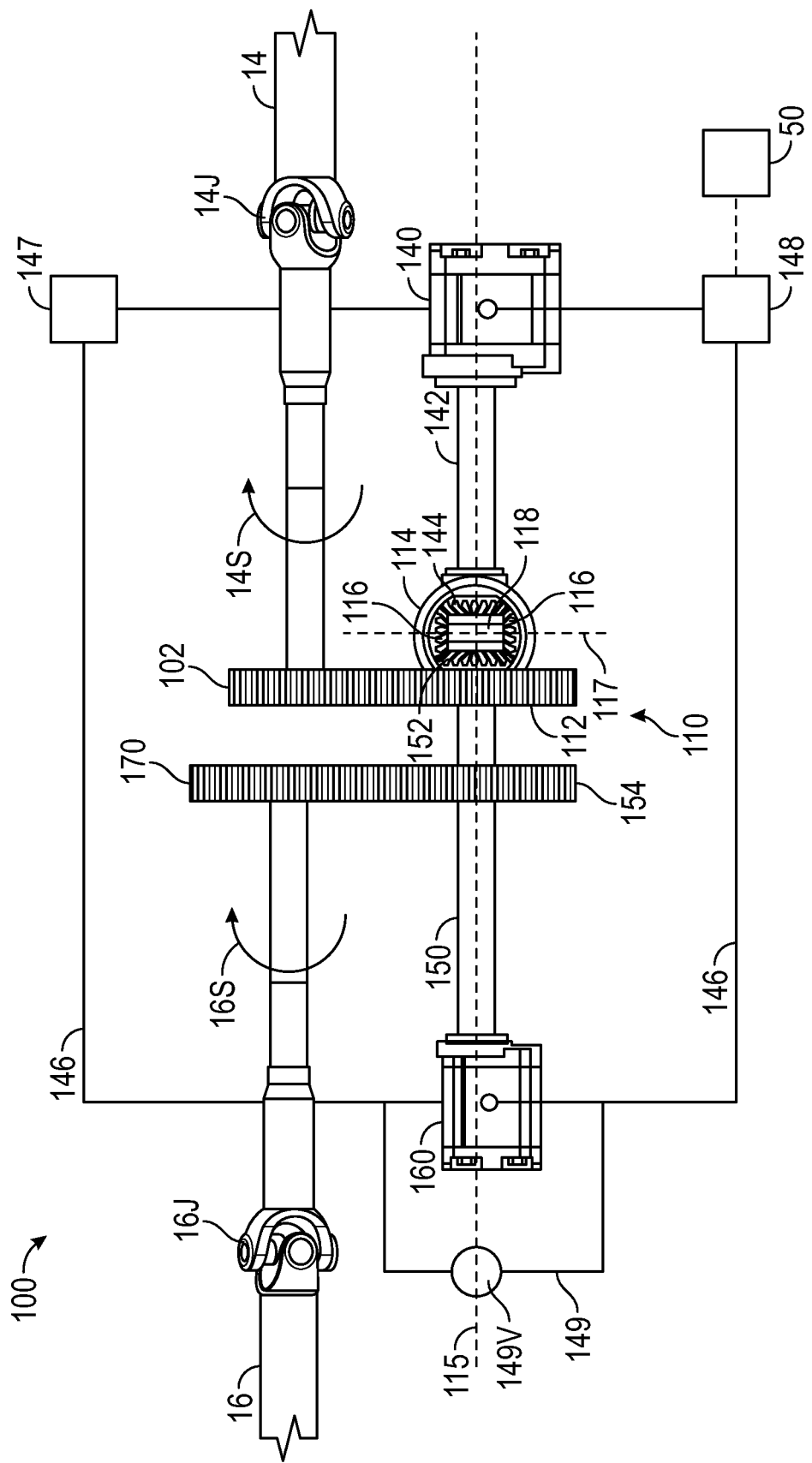
FIG. 2 is a front view of the transmission assembly of FIG. 1.
Figure 3:
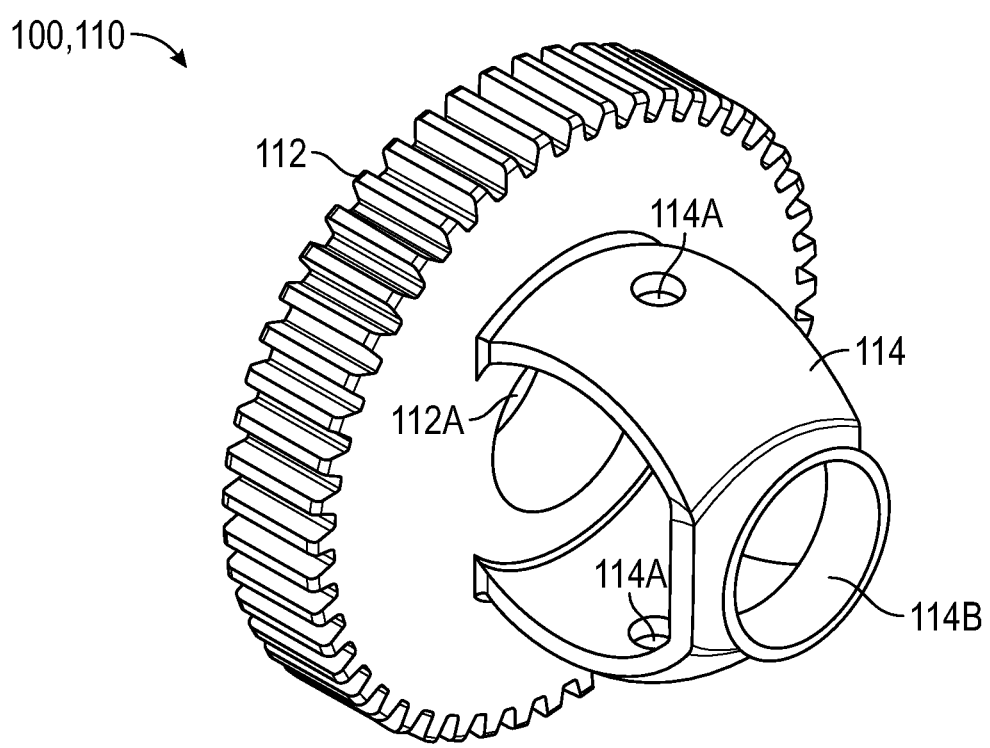
FIG. 3 is a perspective view of an embodiment of a housing of a carrier assembly of the transmission assembly of FIG. 1 in accordance with principles disclosed herein.
Figure 4:
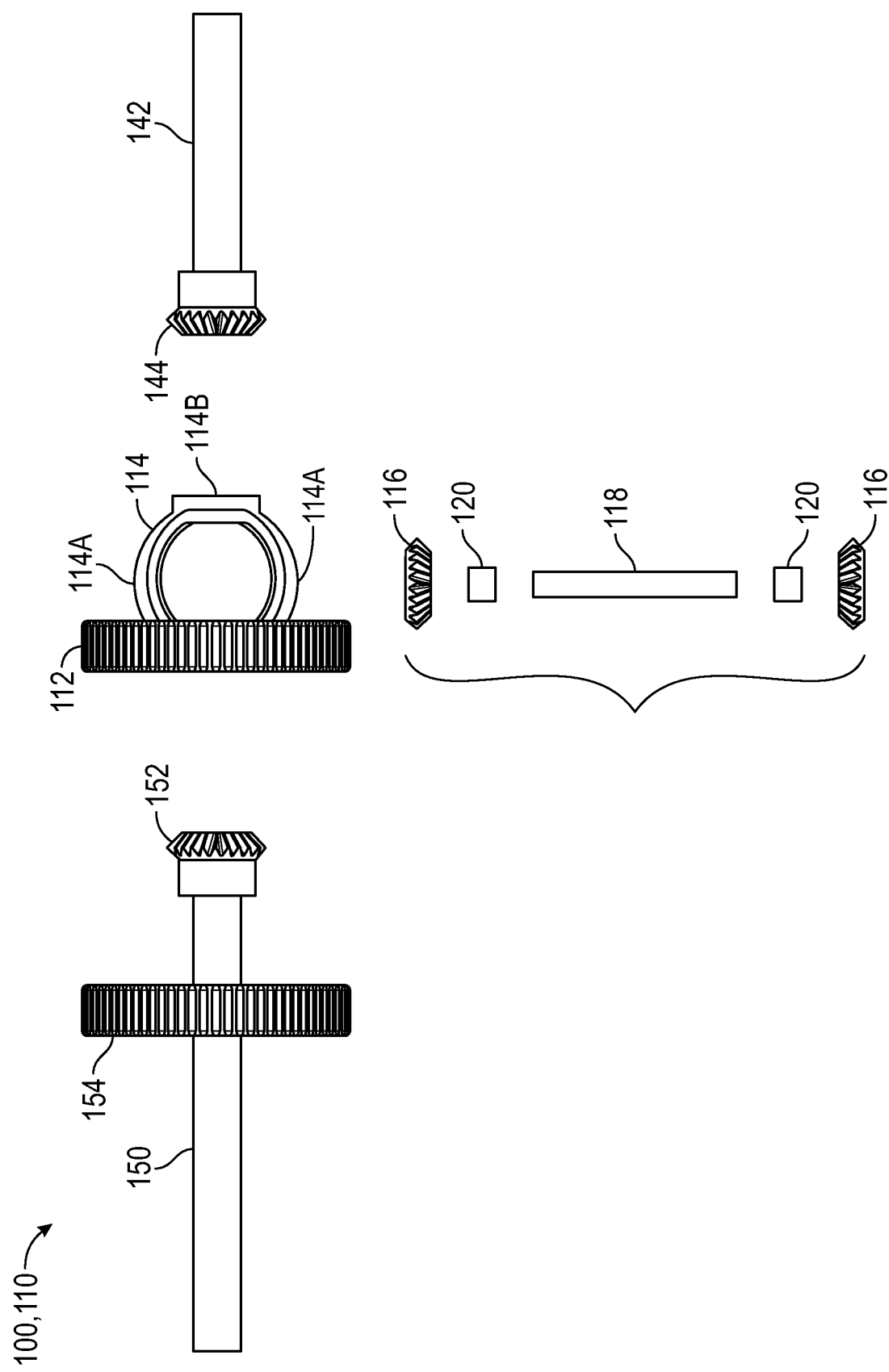
FIG. 4 is an exploded view of an embodiment of a carrier assembly of the transmission assembly of FIG. 1 in accordance with principles disclosed herein.

Referring to FIGS. 1-4, an embodiment of the transmission 100 of the vehicle system 10 is shown. In this embodiment, transmission 100 generally includes an input gear 102, a carrier assembly 110, a load applicator 140, a carrier outlet shaft 150, a torque applicator 160, and a transmission output gear 170. Input gear 102 comprises a plurality of circumferentially spaced gear teeth disposed on an outer surface thereof and is coupled to a terminal end of input shaft 14. In the embodiment of FIGS. 2-4, input shaft 14 includes a pivotable joint (e.g., a U-joint) 14J to permit angular misalignment or bending along a central or longitudinal axis of input shaft 14. Driveshaft 16 similarly includes a pivotal joint (e.g., a U-joint) 16J to permit angular misalignment or bending along a central or longitudinal axis of driveshaft 16. However, in other embodiments, shafts 14 and 16 may not include joints 14J and 16J, respectively.

In this embodiment, carrier assembly 110 includes a ring gear 112, a housing 114 affixed to ring gear 112, a plurality of spider gears 116, and a spider gear shaft or pin 118 extending between the spider gears 116. The ring gear 112 of carrier assembly 110 comprises a plurality of circumferentially spaced teeth that mesh with the teeth of input gear 102 to provide a direct mechanical or geared connection between ring gear 112 and input gear 102. Housing 114, affixed to ring gear 112, is thus rotationally fixed to ring gear 112. In this embodiment, ring gear 112 includes a central opening 112A, and housing 114 includes a pair spider gear openings 114A circumferentially spaced about a first or carrier axis 115 (shown in FIG. 2), and a control shaft opening 114B that is intersected by carrier axis 115.

Each spider gear 116 of carrier assembly 110 is coupled to spider gear shaft 118 while shaft 118 is affixed or coupled to housing 114. Particularly, each spider gear 116 is coupled to a spider gear bearing 120 received in one of the spider gear openings 114A of housing 114. In this arrangement, spider gear bearings 120 permit rotation of spider gears 116 about a spider gear axis 117 relative to spider gear shaft 118, where shaft 118 is rotationally locked to housing 114. In this embodiment, spider gears 116 rotate about spider gear axis 117 continuously when motor vehicle 10 is operated at either low (including stationary) sand high speeds. Thus, unlike differential 18 (which may also include spider gears), spider gear bearings 120 permit continuous rotation of spider gears 116 without failure or breakage over the operational life of motor vehicle 10. In this embodiment, spider gear bearings 120 comprise roller bearings 120 (e.g., needle bearings, etc.) to allow for the reliable continuous rotation of spider gears 116. In this embodiment, spider gear axis 117 is disposed orthogonal and intersects carrier axis 115; however, in other embodiments, spider gear axis 117 need not intersect carrier axis 115.

In this embodiment, input gear 102 of transmission 100 is rotationally fixed or locked to input shaft 14, and thus, rotates at input rotational speed 14S when torque is applied to input shaft 14 from prime mover 12. The rotational speed of ring gear 112, and in turn, housing 114, is determined by the gear ratio or ratio of gear teeth between input gear 102 and ring gear 112. Carrier assembly 110 rotates about carrier axis 115. Additionally, although the embodiment of housing 114 of carrier assembly 110 shown in FIGS. 2-4 does not circumferentially enclose spider gears 116 and spider gear shaft 118, in other embodiments, housing 114 may comprise a generally cylindrical, enclosed case for housing gears 116 and shaft 118. Further, while the embodiment of carrier assembly 110 shown in FIGS. 2-4 comprises a pair of spider gears 116, in other embodiments, assembly 110 may include varying numbers of spider gears 116, including a single gear 116. In this embodiment, spider gears 116 are permitted to rotate freely (via spider gear bearings 120) about spider gear axis 117, where axis 117 is disposed coaxial with a longitudinal axis of spider gear shaft 118.

In this embodiment, transmission 100 additionally includes a control shaft 142 coupled with load applicator 140, control shaft 142 including a control gear 144 at a terminal end thereof that is rotationally fixed to control shaft 142. Load applicator 140 is in signal communication with the controller 50 of motor vehicle system 10, and selectively provides a resistive or reaction torque to control shaft 142 coupled therewith, where a control gear 144 is coupled or affixed to a terminal end of control shaft 142. In this embodiment, load applicator 140 comprises a hydraulic pump powered by the rotation of control shaft 142. Additionally, in this embodiment, torque applicator 160 comprises a hydraulic motor.

In this embodiment, transmission 100 includes a hydraulic circuit or loop 146 extending between load applicator 140 and torque applicator 160, thereby providing fluid communication between load applicator 140 and torque applicator 160. Additionally, in this embodiment, the hydraulic circuit 146 of transmission 100 includes a fluid or hydraulic reservoir 147, a load controller 148, and a bypass conduit or circuit 149 that includes a bypass valve 149V. In this arrangement, hydraulic circuit 146 is fluidically coupled to load controller 148, load applicator 140, bypass circuit 149, and torque applicator 160. Hydraulic reservoir 147 provides a source of hydraulic fluid for hydraulic circuit 146. Load controller 148 selectably or controllably restricts fluid flow through hydraulic circuit 146 to thereby exert a load or resistive torque on control shaft 142. For instance, if load controller 148 is disposed in a fully closed position, hydraulic fluid is restricted from flowing through hydraulic circuit 146 and load applicator 140, preventing a rotor of applicator 140, which is rotationally fixed to control shaft 142, from rotating. Conversely, when load controller 148 is in a fully open position, fluid is permitted to flow freely through hydraulic circuit 146 and load applicator 140 does not restrict or hinder control shaft 142 from rotating. Additionally, load controller 148 includes a plurality of positions between the fully closed and fully open positions that apply a controlled or predetermined degree of resistance to the rotation of control shaft 142. In this embodiment, load applicator 148 comprises a valve; however, in other embodiments, load applicator 148 may comprise a choke, throttle, or other device for selectably permitting fluid flow therethrough. Further, in this embodiment, load applicator 148 is in signal communication with powertrain controller 50. In this arrangement, the degree of resistive torque or load applied to control shaft 142 via load applicator 140 may be controlled through load applicator 148 using powertrain controller 50.

Torque applicator 160 of transmission 100 translates the pressure of hydraulic fluid flowing through hydraulic circuit 146 into rotational torque, and applies the rotational torque to carrier outlet shaft 150, thereby increasing the amount of torque and power transferred to driveshaft 16. In this manner, torque applicator 160 is configured to increase the efficiency (transfer of energy between input shaft 14 and driveshaft 16) of transmission 100. Particularly, torque applicator 160 is configured to increase the amount of torque applied to wheels 22 when motor vehicle 10 accelerates from a stationary position. Additionally, when motor vehicle 10 is operating at relatively high speeds (e.g., at highway speeds, etc.), it may be advantageous to allow the hydraulic fluid of circuit 146 to bypass torque applicator 160, which may introduce drag or otherwise hinder the flow of hydraulic fluid of circuit 146. Thus, in this embodiment, bypass circuit 149 is configured to selectably allow hydraulic fluid of circuit 146 to bypass torque applicator 160.

Specifically, bypass valve 149V is actuatable between a closed position restricting fluid flow through bypass circuit 149 and an open position permitting fluid flow therethrough. When bypass valve 149V is in the open position, hydraulic fluid in circuit 146 may flow through bypass circuit 149 and thereby bypass torque applicator 160, where bypass circuit 149 provides less resistance to the flow of hydraulic fluid therethrough than torque applicator 160. In this embodiment, bypass valve 149V is in signal communication with powertrain controller 50, where powertrain controller 50 is configured to control the actuation of valve 149V. For instance, powertrain controller 50 may be configured to open bypass valve 149V when motor vehicle 10 is operating at a predetermined speed, or when the load applied to prime mover 12 is less than a predetermined, threshold value.

Although in this embodiment load applicator 140, torque applicator 160, and load controller 148 comprise fluid or hydraulic components, in other embodiments, load applicator 140, torque applicator 160, and load controller 148 may comprise mechanical, pneumatic, or electromechanical components. For instance, in other embodiments, load applicator 140 may comprise a mechanical clutch, an electrical actuator or solenoid, or other mechanism configured to selectably apply a resistive torque to control shaft 142. Similarly, in other embodiments, torque applicator 160 may comprise mechanical or electromechanical systems configured to apply a torque to carrier outlet shaft 150. In still other embodiments, transmission 100 may not include torque applicator 160.

In this embodiment, control shaft 142 and control gear 144 extend along and rotate about carrier axis 115. A plurality of circumferentially spaced teeth of control gear 144 meshes with a corresponding plurality of circumferentially spaced teeth of each spider gear 116, providing a geared or meshed coupling therebetween. Carrier outlet shaft 150 of transmission 100 extends along and rotates about carrier axis 115 and includes a first or side gear 152 disposed at a terminal end of outlet shaft 150 opposite the end coupled to torque applicator 160, and a second or variable output gear 154 longitudinally spaced from side gear 152. A plurality of circumferentially spaced teeth of side gear 152 meshes with the teeth of spider gears 116 in an arrangement similar to the coupling between control gear 144 and spider gears 116. Thus, rotation of carrier outlet shaft 150 about carrier axis 115 results in corresponding rotation of spider gears 116 about spider gear axis 117. As described above, carrier outlet shaft 150 extends through the central opening 112A of ring gear 112, and thus, is not directly coupled with ring gear 112.

In this embodiment, variable output gear 154 of transmission 100 comprises a plurality of circumferentially spaced teeth that mesh with a plurality of circumferentially spaced teeth of transmission output gear 170 to provide a direct mechanical or geared connection therebetween. Transmission output gear 170 is coupled or affixed to driveshaft 16, and thus, driveshaft 16 and transmission output gear 170 each rotate at output rotational speed 16S when driven by variable output gear 154. Although in this embodiment transmission 100 includes variable output gear 154 and transmission output gear 170, in other embodiments, driveshaft 16 may be directly coupled with carrier outlet shaft 150 such that no gear linkage or coupling is disposed between shafts 16 and 150.

During operation of transmission 100 and motor vehicle system 10, torque is transmitted to carrier assembly 110 from prime mover 12 via the mesh formed between input gear 102 and ring gear 112, resulting in rotation of carrier assembly 110 about carrier axis 115. The rotation of spider gear shaft 118 about carrier axis 115 results in the application of a torque between spider gears 116 and both control shaft 142 and carrier outlet shaft 150 about carrier axis 115 in response to the mesh formed between spider gears 116 and both control gear 144 and side gear 152, respectively. In this manner, the rate of rotation of control shaft 142 and carrier outlet shaft 150 is dependent upon the resistive or reactive torque applied to control shaft 142 from load applicator 140 and carrier outlet shaft 150 from transmission output gear 170 (i.e., the resistance to rotating wheels 22) that acts to resist rotation of control shaft 142 and carrier outlet shaft 150, respectively. Thus, if an equal resistive torque is applied to both control shaft 142 and carrier outlet shaft 150, then control shaft 142 and carrier outlet shaft 150 rotate at the same rotational speed about carrier axis 115 while spider gears 116 remain stationary respective spider gear axis 117. Conversely, if the resistive torque differs between control shaft 142 and carrier outlet shaft 150, then spider gears 116 rotate about spider gear axis 117 to allow control shaft 142 and carrier outlet shaft 150 rotate at different rotational speeds. As described above, in this embodiment, the degree of resistive torque applied to control shaft 150 by load applicator 140 is controlled via load controller 148.

In this embodiment, if an equal resistive torque is applied to control shaft 142 and carrier outlet shaft 150 (an equal load condition), then carrier outlet shaft 150 will rotate about carrier axis 115 at the same rotational speed as spider gear shaft 118 and spider gears 116 rotate about axis 115, providing a gear ratio of 1.0 between carrier assembly 110 and side gear 152 of carrier outlet shaft 150. However, if no resistive torque (or only a minimal amount of resistive torque) is applied to control shaft 142 from applicator 140 while resistive torque is applied to carrier outlet shaft 150 from transmission output gear 170, then the control shaft 142 rotates about carrier axis 115 at twice the rotational speed of carrier assembly 110 while carrier outlet shaft 150 remains stationary respective carrier axis 115, providing a gear ratio of 0.0 between carrier assembly 110 and side gear 152 of carrier outlet shaft 150. In response to the application of a resistive torque to control shaft 142 from applicator 140, torque from spider gears 116 begins to be transferred to carrier outlet shaft 150, resulting in a rotation of shaft 150 about carrier axis 115.

As the amount of resistive torque applied to control shaft 142 from applicator 140 is continuously increased, the amount of torque and rotational speed of carrier outlet shaft 150 is correspondingly increased. In response to the application of a threshold or maximum resistive torque to control shaft 142 from applicator 140, control shaft 142 ceases to rotate about carrier axis 115 while the rotational speed of carrier outlet shaft 150 about carrier axis 115 is increased to twice the rotational speed of carrier assembly 110 about axis 115, providing a gear ratio of 2.0 between carrier assembly 110 and side gear 152 of carrier outlet shaft 150. Thus, in this embodiment, by varying the degree of resistive torque applied to control shaft 142 from applicator 140, the gear ratio between carrier assembly 110 and the side gear 152 of carrier outlet shaft 150 is correspondingly varied between 0.0 and 2.0, providing a continuously or infinitely variable transmission between input shaft 14 and driveshaft 16 without engaging/disengaging any gears or clutches, and without relying on torque-limited frictional engagement via a belt and pulley assembly.

The output rotational speed 16S of driveshaft 16, and the overall gear ratio provided by transmission 100, is determined by the torque provided to input shaft 14 from prime mover 12, the input rotational speed 14S of input shaft 14, and the amount of resistive torque applied to control shaft 142 from load applicator 140. In this embodiment, controller 50 determines the amount of resistive torque applied to control shaft 142 from applicator 140 in response to the measured control parameters identified above. Particularly, in this embodiment, controller 50 adjusts or controls the position of load controller 148 to thereby adjust a resistance to fluid flow through hydraulic circuit 146, thereby adjusting the resistive torque applied to control shaft 142 from load applicator 140. In other words, as the resistance to fluid flow through hydraulic circuit 146 is increased by closing load controller 148, the amount of resistive torque applied to control shaft 142 from load applicator 140 is also increased. Further, as the amount of resistive torque applied to control shaft 142 continuously increases, the gear ratio provided by carrier assembly 110 and transmission 100 between input shaft 14 and driveshaft 16 is continuously increased. Thus, in this embodiment, carrier assembly 110 and transmission 100 provides a geared coupling (e.g., a coupling that does not rely on belts, chains, etc., for transmitting torque) and a continuously variable gear ratio between input shaft 14 and driveshaft 16.

As described above, in some embodiments, controller 50 (via load controller 148) increases the resistive torque applied to control shaft 142 by applicator 140, thereby increasing the amount of torque applied to carrier outlet shaft 150 and the rotational speed 16S of driveshaft 16, in response to a measured change in throttle position indicating the desire of a user of motor vehicle system 10 to increase the speed of system 10. In some embodiments, controller 50 and load controller 148 adjust the resistive torque applied to control shaft 142 from load applicator 140 to maximize the fuel economy of prime mover 12, such as by decreasing the gear ratio of transmission 100 (i.e., reducing the difference between input rotational speed 14S and output rotational speed 16S). In still further embodiments, controller 50 and load controller 148 increase the resistive torque applied to control shaft 14 in response to a measured increase in the load or resistance to rotation of wheels 22, thereby increasing the amount of torque transmitted to carrier outlet shaft 150 and driveshaft 16.

Figure 5:
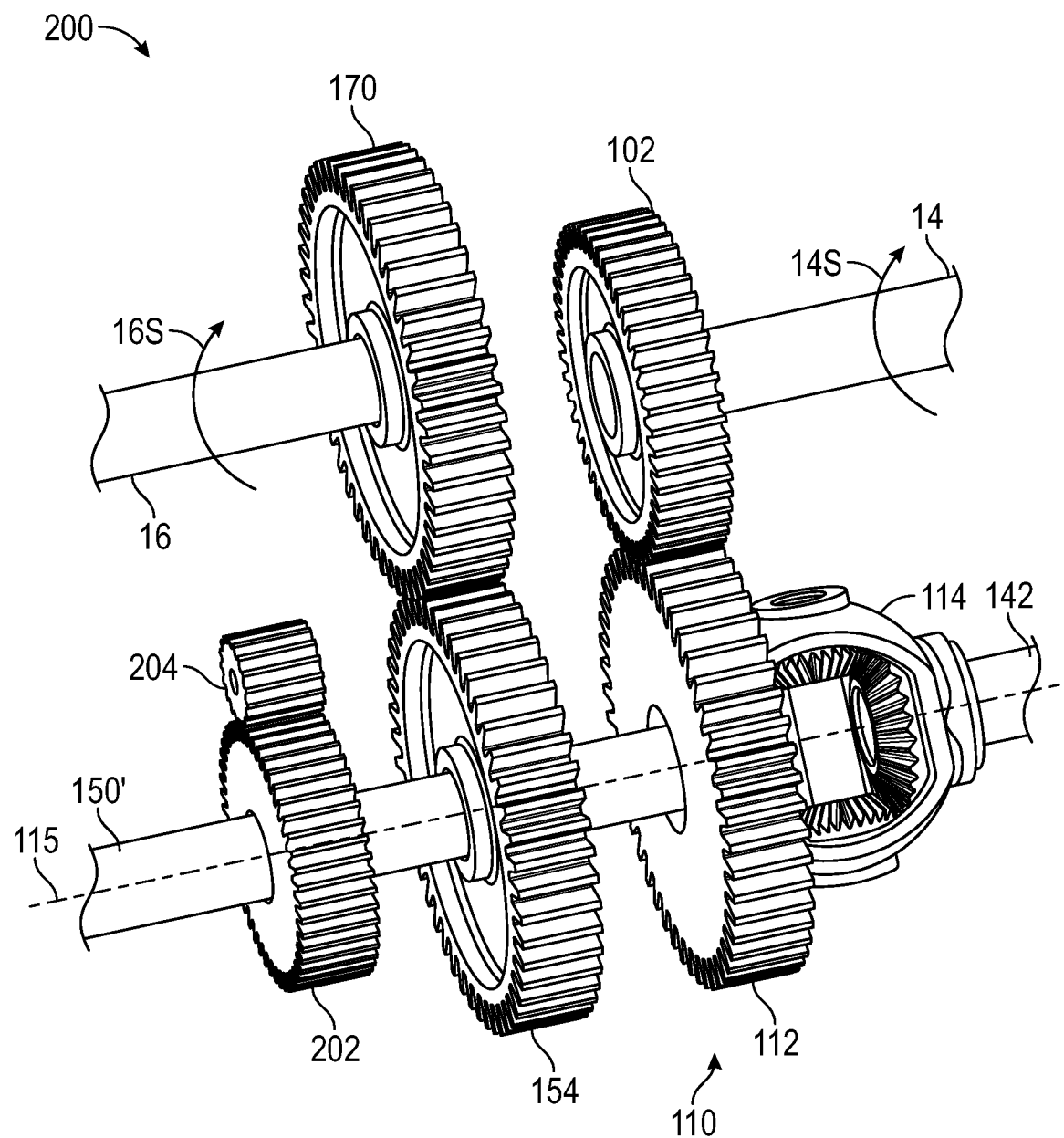
FIG. 5 is a perspective view of another embodiment of a transmission assembly shown in a first position in accordance with principles disclosed herein.
Figure 6:
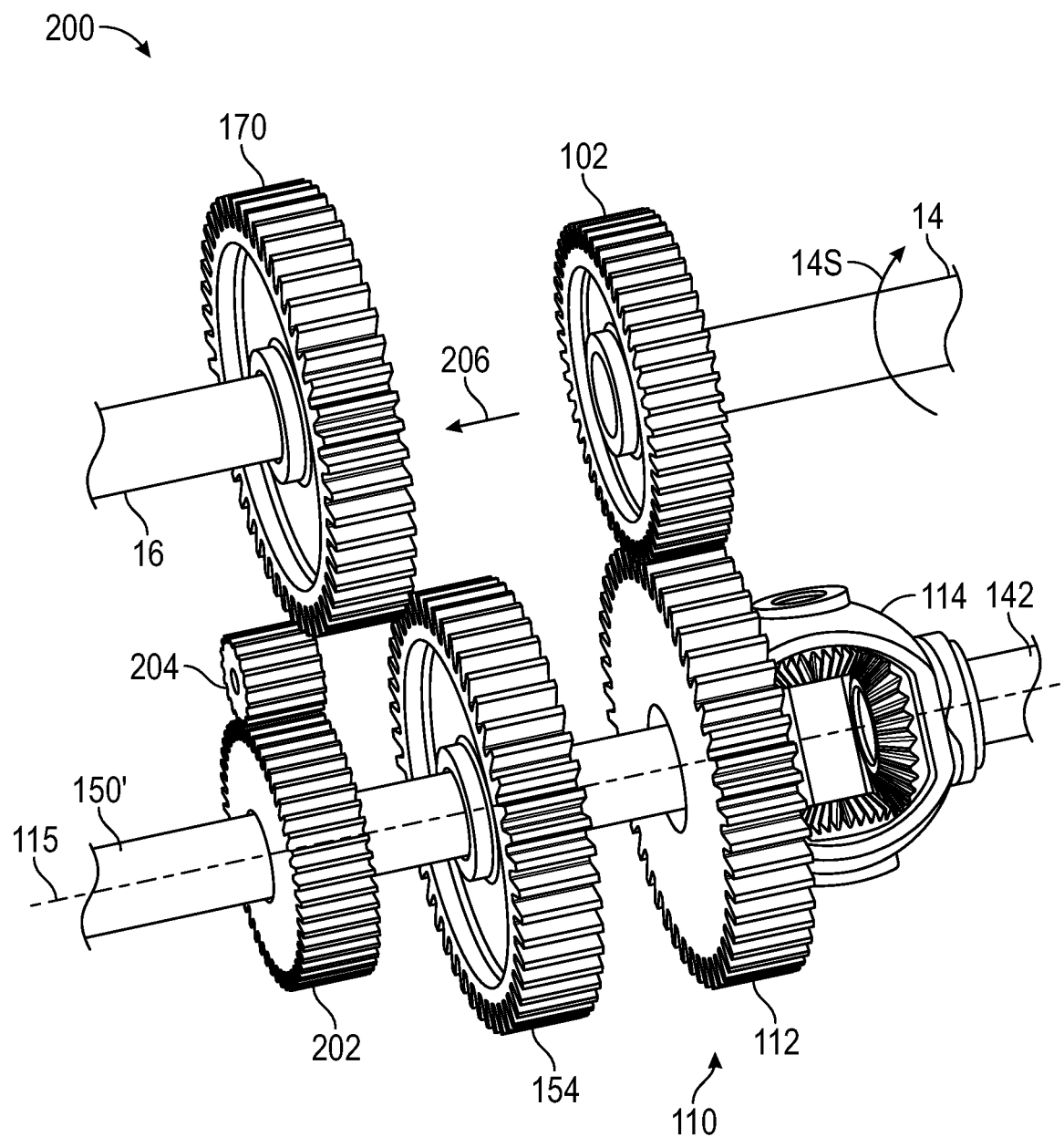
FIG. 6 is a perspective view of the transmission assembly of FIG. 5 shown in a second position.
Figure 7:
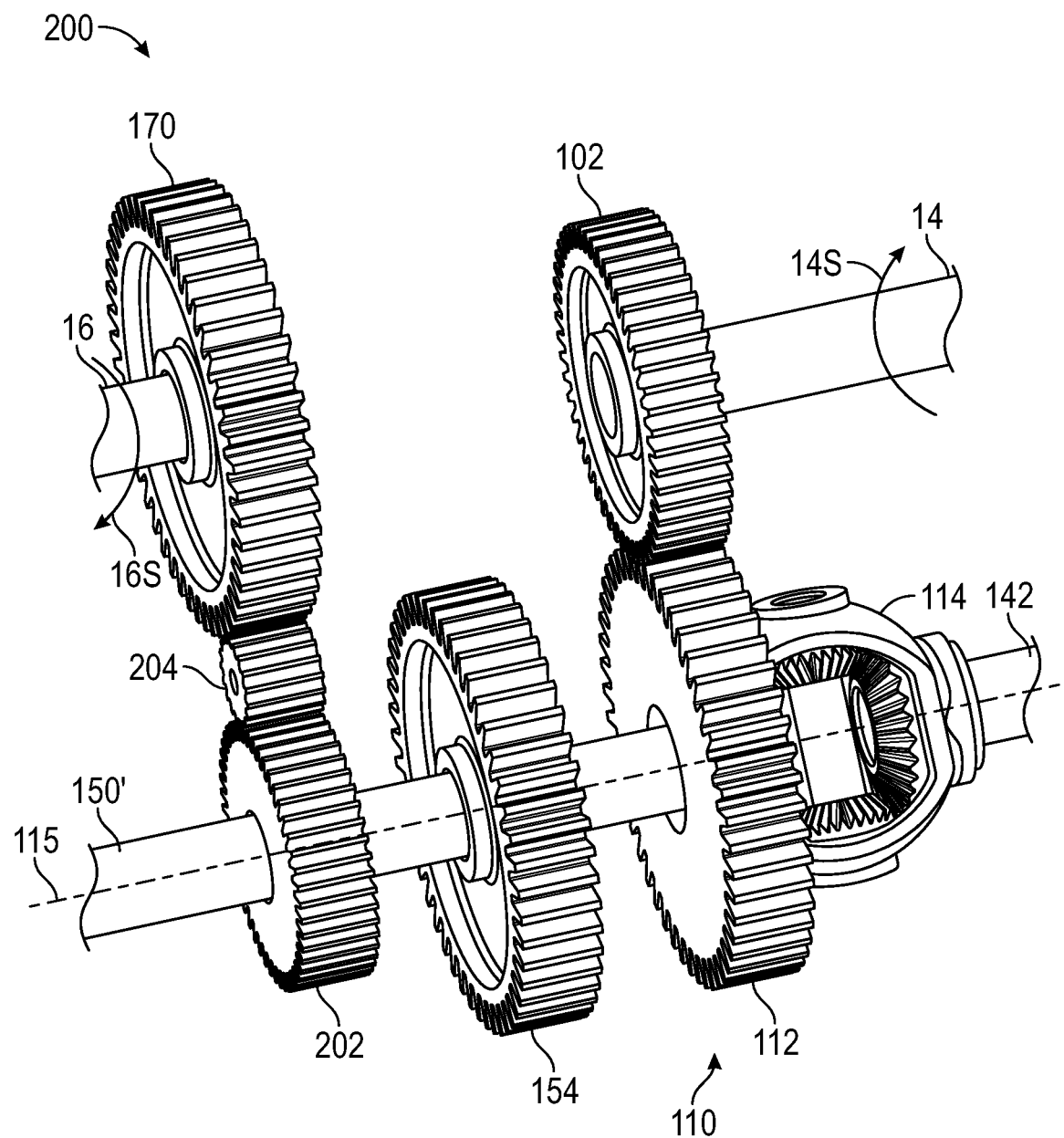
FIG. 7 is a perspective view of the transmission assembly of FIG. 5 shown in a third position.

Referring to FIGS. 5-7, another embodiment of a transmission 200 for use with the motor vehicle system 10 of FIG. 1 is shown. Transmission 200 includes features in common with the transmission 100 of FIGS. 2-4, and shared features are labeled similarly. In the embodiment of FIGS. 5-7, the carrier outlet shaft 150' of transmission 200 includes a reverse gear 202 rotationally fixed thereto, where reverse gear 202 is disposed adjacent but longitudinally spaced from variable output gear 154. Additionally, transmission 200 includes an idler gear 204 in meshed or geared engagement with reverse gear 202. Idler gear 204 is support on an idler shaft (not shown in FIGS. 5-7), and thus, is permitted to rotate freely in concert with reverse gear 202.

Reverse gear 202 and idler gear 204 of transmission 200 selectably provide for the counter or reverse rotation of driveshaft 16 relative to input shaft 14. Additionally, in this embodiment, transmission output gear 170 is moveable along a longitudinal axis thereof that is parallel with carrier axis 115 to selectably engage variable output gear 154 and reverse gear 202. As shown particularly in FIG. 5, transmission output gear 170 may occupy a first position in meshed engagement with variable output gear 154. In the first position, transmission output gear 170 and driveshaft 16 rotate in the same rotational direction (e.g., a first rotational direction) as input shaft 14 in response to rotation of variable output gear 154, thereby causing motor vehicle 10 to move in a first direction.

In some applications, it may be advantageous to cause motor vehicle 10 to move in a second or reverse direction opposite the first direction. In this embodiment, to move vehicle 10 in the reverse direction, transmission output gear 170 is displaced longitudinally (indicated by arrow 206)

towards idler gear 204 and reverse gear 202, as shown particularly in FIG. 6. Transmission output gear 170 is shifted in the direction of arrow 206 until transmission output gear 170 is disposed in a second position aligned (respective carrier axis 115) with idler gear 204 and reverse gear 202, As shown particularly in FIG. 7. In the second position, transmission output gear 170 is in meshed or geared engagement with idler gear 204. Thus, in the second position, transmission output gear 170 and driveshaft 16 rotate in a rotational direction opposite input shaft 14 (e.g., a second rotational direction) in response to rotation of variable output gear 154, thereby causing motor vehicle 10 to move in the reverse direction. In this embodiment, transmission output gear 170 is actuated between the first and second positions by an operator of motor vehicle 10 using a mechanical linkage system; however, in other embodiments, transmission output gear 170 may be actuated between the first and second positions via hydraulic or electromechanical systems.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A transmission assembly, comprising:
    a ring gear configured to receive an input torque from a power source;
    a carrier assembly coupled to the ring gear, the carrier assembly configured to rotate about a first axis and comprising:
        a housing; and
        a spider gear rotatably coupled to the housing;
    a carrier outlet shaft comprising a carrier outlet gear in meshed engagement with the spider gear, wherein the carrier outlet shaft is configured to transmit an output torque to a driveshaft;
    a control shaft comprising a control gear in meshed engagement with the spider gear;
    a load applicator coupled to the control shaft, wherein the load applicator is configured to provide a resistive torque to the control shaft to resist rotation of the control shaft and vary a gear ratio between the driveshaft and an input shaft;
    a torque applicator configured to controllably apply torque to the carrier outlet shaft;
    a hydraulic circuit coupled to the load applicator and a load controller configured to control the amount of resistive torque applied to the control shaft from the load applicator;
    a bypass circuit fluidically coupled to the hydraulic circuit; and
    a bypass valve fluidically coupled to the bypass circuit and configured to permit a fluid flow in the hydraulic circuit to bypass the torque applicator when the bypass valve is in an open position;
    wherein the load applicator comprises a pump fluidically coupled to the hydraulic circuit;
    wherein the torque applicator comprises a motor fluidically coupled to the hydraulic circuit and is configured to convert pressure of hydraulic fluid in the hydraulic circuit into rotational torque.

2. The transmission assembly of claim 1, wherein the spider gear is configured to rotate about a second axis orthogonal to the first axis.

3. The transmission assembly of claim 1, wherein the load applicator is configured to provide the resistive torque to the control shaft in response to the application of the input torque to the ring gear.

4. The transmission assembly of claim 1, wherein, in response to the application of the resistive torque to the control shaft, the control shaft rotates at a rotational speed that is different from the rotational speed of the carrier outlet shaft.

5. The transmission assembly of claim 1, wherein the load controller comprises a valve configured to controllably restrict fluid flow through the hydraulic circuit.

6. The transmission assembly of claim 5, further comprising a controller in signal communication with the load controller and configured to actuate the load controller between open and closed positions.

7. The transmission assembly of claim 1, further comprising a roller bearing coupled between the spider gear and the housing of the carrier assembly.

8. A transmission assembly, comprising:
    a ring gear configured to receive an input torque from a power source;
    a carrier assembly coupled to the ring gear;
    a carrier outlet shaft coupled to the carrier assembly and configured to transmit an output torque to a driveshaft;
    a control shaft comprising a control gear coupled to the carrier assembly;
    a load applicator coupled to the control shaft, wherein the load applicator is configured to provide a resistive torque to the control shaft to resist rotation of the control shaft;
    a load controller coupled to the load applicator and configured to control the amount of resistive torque applied to the control shaft from the load applicator;
    a hydraulic circuit coupled to the load controller and the load applicator; and
    a reverse gear coupled to the carrier outlet shaft;
    wherein the load applicator comprises a pump fluidically coupled to the hydraulic circuit and the load controller comprises a valve configured to controllably restrict fluid flow through the hydraulic circuit.

9. The transmission assembly of claim 8, wherein the carrier assembly comprises:
    a housing; and
    a spider gear rotatably coupled to the housing;
    wherein the carrier outlet shaft comprises a carrier outlet gear in meshed engagement with the spider gear and wherein the control gear is in meshed engagement with the spider gear.

10. The transmission assembly of claim 9, further comprising a roller bearing coupled between the spider gear and the housing of the carrier assembly.

11. A motor vehicle system, comprising:
a prime mover;
a transmission rotatably coupled to the prime mover with an input shaft;
a driveshaft rotatably coupled to the transmission;
a ring gear configured to receive an input torque from the prime mover;
a carrier assembly coupled to the ring gear, the carrier assembly configured to rotate about a first axis and comprising:
   a housing; and
   a spider gear rotatably coupled to the housing;
a carrier outlet shaft comprising a carrier outlet gear in meshed engagement with the spider gear;
a control shaft comprising a control gear in meshed engagement with the spider gear; and
a load applicator coupled to the control shaft, wherein the load applicator is configured to provide a resistive torque to the control shaft to resist rotation of the control shaft and vary the gear ratio between the driveshaft and the input shaft;
wherein the transmission provides a cleared coupling between the input shaft and the driveshaft;
wherein the transmission provides a continuously variable gear ratio between the input shaft and the driveshaft;
wherein the transmission further comprises a reverse gear coupled to the carrier outlet shaft of the carrier assembly.

12. The motor vehicle system of claim 11, further comprising:
a hydraulic circuit fluidically coupled to the load applicator;
a load controller fluidically coupled to the hydraulic circuit and configured to control the amount of resistive torque applied to the control shaft from the load applicator, wherein the load controller comprises a valve configured to controllably restrict fluid flow through the hydraulic circuit; and
a controller in signal communication with the load controller and configured to actuate the load controller between open and closed positions.

13. The motor vehicle system of claim 12, further comprising a torque applicator configured to controllably apply torque to the carrier outlet shaft, wherein the torque applicator comprises a motor fluidically coupled to the hydraulic circuit and is configured to convert pressure of hydraulic fluid in the hydraulic circuit into rotational torque.

14. A transmission assembly, comprising:
a ring gear configured to receive an input torque from a power source;
a carrier assembly coupled to the ring gear;
a carrier outlet shaft coupled to the carrier assembly and configured to transmit an output torque to a driveshaft;
a control shaft comprising a control gear coupled to the carrier assembly;
a load applicator coupled to the control shaft, wherein the load applicator is configured to provide a resistive torque to the control shaft to resist rotation of the control shaft;
a load controller coupled to the load applicator and configured to control the amount of resistive torque applied to the control shaft from the load applicator;
a torque applicator configured to controllably apply torque to the carrier outlet shaft;
a hydraulic circuit coupled to the load controller and the load applicator;
a bypass circuit fluidically coupled to the hydraulic circuit; and
a bypass valve fluidically coupled to the bypass circuit and configured to permit a fluid flow in the hydraulic circuit to bypass the torque applicator when the bypass valve is in an open position.

15. The transmission assembly of claim 14, wherein the hydraulic circuit is configured to control the amount of resistive torque applied to the control shaft from the load applicator.

16. The transmission assembly of claim 14, wherein the load applicator comprises a pump fluidically coupled to the hydraulic circuit and the load controller comprises a valve configured to controllably restrict fluid flow through the hydraulic circuit.

17. The transmission assembly of claim 14, wherein the torque applicator comprises a motor fluidically coupled to the hydraulic circuit and is configured to convert pressure of hydraulic fluid in the hydraulic circuit into rotational torque.

18. The transmission assembly of claim 14, wherein the carrier assembly comprises:
a housing; and
a spider gear rotatably coupled to the housing;
wherein the carrier outlet shaft comprises a carrier outlet gear in meshed engagement with the spider gear and wherein the control gear is in meshed engagement with the spider gear.

19. The transmission assembly of claim 18, further comprising a roller bearing coupled between the spider gear and the housing of the carrier assembly.

20. The transmission assembly of claim 14, further comprising a reverse gear coupled to the carrier outlet shaft.

* * * * *